Figure 1:
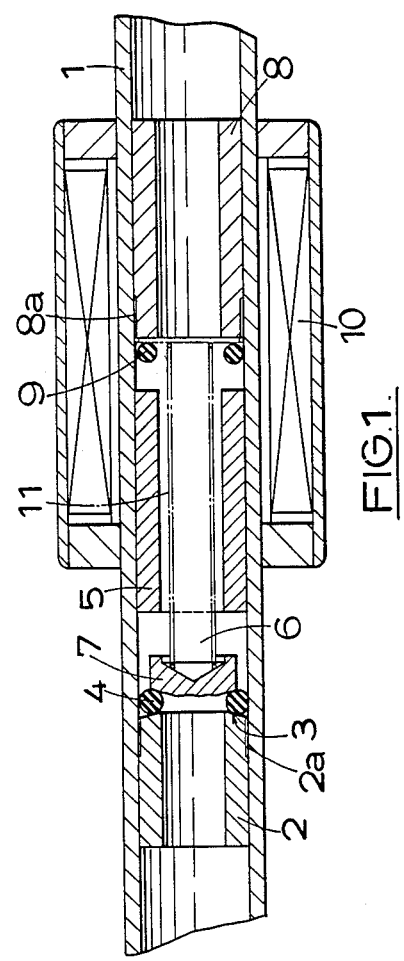

United States Patent [19]

Henville

[11] Patent Number: 4,835,426
[45] Date of Patent: May 30, 1989

[54] SOLENOID-OPERATED VALVES

[75] Inventor: Michael I. Henville, Wokingham, England

[73] Assignee: Unimax Switch Limited, Kettering, England

[21] Appl. No.: 213,240

[22] Filed: Jun. 27, 1988

[30] Foreign Application Priority Data

Jun. 27, 1987 [GB] United Kingdom ............... 8715125

[51] Int. Cl.⁴ .................... H02K 33/02; H01F 3/00
[52] U.S. Cl. ........................................ 310/23; 310/30; 335/250; 335/255; 335/278
[58] Field of Search ............... 310/14, 23, 30, 34; 335/250, 255, 256, 265, 266, 278, 282

[56] References Cited

U.S. PATENT DOCUMENTS 3,841,798 10/1974 Rehfield .................................. 310/34
4,240,468 12/1980 Brand et al. ........................ 335/255

Primary Examiner—Patrick R. Salce
Assistant Examiner—Judson H. Jones
Attorney, Agent, or Firm—Scrivener and Clarke

[57] ABSTRACT

A solenoid-operated valve has its body formed from a plain length of pipe substantially free of any machining or shoulders. The armature and seating are inside, with the armature moving axially, and the solenoid coil is slid over the outside of the pipe. There could be a by-pass and two valves, one with a by-pass and one without, could be mounted in series in a common length of pipe.

13 Claims, 1 Drawing Sheet

U.S. Patent

May 30, 1989

4,835,426

SOLENOID-OPERATED VALVES

This invention is concerned with solenoid-operated valves for regulating the flow of a fluid in a pipe, for example for controlling the flow of gas in pipes leading to domestic gas appliances.

There are many types of solenoid-operated valves already known, of which the most common for domestic gas appliances is the type in which a cast or forged body has a movable armature of a solenoid arranged with its axis inclined to, or perpendicular to, the axis of flow. The bodies of such valves are made usually by casting or forging, and then machined to form or receive the seating of, and to provide a mounting for, the solenoid. Other solenoid-operated valves have been proposed in which the solenoid coil and armature are provided in a body co-axial with the flow of the fluid in the pipe to which the valve is attached by means of machined connections at each end of the body.

It is an aim of the present invention to provide a solenoid-operated valve that is of simple construction and low cost, easy to manufacture and assemble in large numbers, and is particularly compact.

According to the invention we propose a solenoid-operated valve for fluids in which the body of the valve is formed as a plain length of pipe of uniform diameter, substantially free of shoulders or machined surfaces, and contains an armature of ferromagnetic material which is movable axially within the pipe and has a valve head movable into and out of engagement with a seating secured within the pipe, clearance being provided in the cross-section of the armature and the seating for the passage for fluid axially through the pipe, and an actuating solenoid coil fitting over the substantially smooth exterior of the pipe.

Preferably there is a stop secured within the pipe against which the armature engages to define the open position of the valve. The stop has clearance in its cross-section to allow fluid to flow along the pipe. The stop is preferably of ferromagnetic material so as to enhance the magnetic properties of the actuating solenoid. A resilient cushioning member may be provided between the armature and the stop.

The clearance for the passage of fluid through the armature and stop is preferably achieved by forming them as hollow cylindrical bodies. The seating is provided on or adjacent a support inserted inside the the pipe and secured firmly to the pipe. The seating may be resilient and may comprise an O-ring located between the support and the valve head. The support may also be a hollow cylindrical body.

Preferably the pipe and the support are of non-ferromagnetic material, such as brass or copper and there may be a coil spring biasing the armature towards or away from the seating so as to make the valve normally open or normally closed in the de-energised state, according to requirements.

Also according to the invention there is proposed a method of manufacturing a solenoid-operated valve for fluids comprising the steps of taking a length of plain drawn non-ferrous pipe, locating within it a valve seating, mounting within it an armature which is movable within the pipe and carries a valve head thereby movable into and out of engagement with the seating, locating within it a stop defining the position of the armature in the open position of the valve, and mounting within it also a spring acting on the armature or valve head, and locating on the outside of the pipe a solenoid for acting on the armature.

Figure 2:
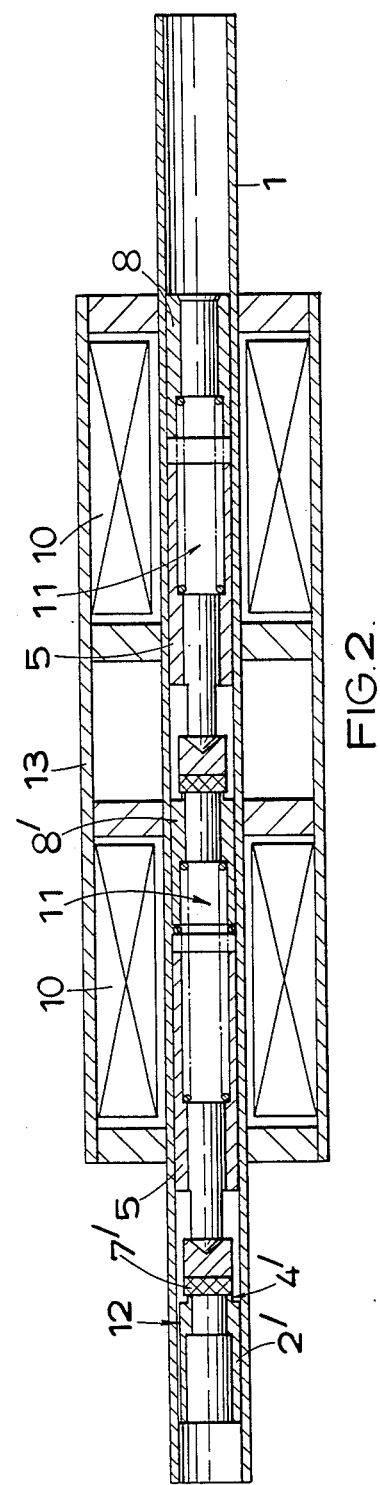

An embodiment of the invention will now be described by way of example only, with reference to the accompanying drawings in which:

FIG. 1 shows in section a solenoid-operated valve in accordance with the invention; and FIG. 2 shows a modified version incorporating further features.

The main body of the valve is formed by a plain length of drawn brass gas pipe 1, substantially free of any machining; in a typical example it is of 6.25 mm outside diameter. Drawn brass pipe, quite apart from being readily commercially available, has been found to have a greater life than a forged or cast and machined body, and its qualities can be further enhanced by the known 'ballizing' process to burnish its inside surface.

Within this body 1 there is a seating support in the form of a brass bush 2, force-fitted into the pipe, and it may have a slightly reduced end 2a to facilitate its initial entry. The inner face 3 of this bush is of frusto-conical shape to form a backing for a silicone rubber O-ring 4 which forms the seating of the valve. An armature 5 of ferromagnetic material is an easy sliding fit in the pipe 1 and is of tubular shape over the greater part of its length but terminates in a spigot portion 6 carrying a valve head 7 to engage the seating 4.

Behind the armature is a fixed ferromagnetic stop in the form of a bush 8, force-fitted in the pipe 1 and, like the bush 2, with a redued diameter 8a over a part of its length to facilitate entry. The stop forms part of the magnetic circuit as well as defining the open position of the valve. An O-ring 9 between the stop and the armature forms a cushion to keep to a minimum the noise made when the valve opens.

An actuating coil assembly 10 is slipped over the smooth external surface of the pipe 1. It may be held in place by friction or by adhesive, or by slight deformation of the material of the pipe or of the casing of the coil if necessary. The stop 8 and seating support 2 may be similarly secured if the force-fit is not felt to be sufficient, or by soldering or brazing.

In the example shown the valve is urged to its closed position by a beryllium-copper helical coil compression spring 11 engaging behind the head 7 and abutting against the stop 8; its end coil is enlarged to be trapped behind the O-ring 9.

It will be appreciated that the valve described is of very simple and economical construction and takes up a minimum of space. It can be assembled from one end or from both, and the two ends of the pipe 1 can be provided with any of the normal connections used with gas piping. It would be possible to supply the inside and outside components of the valve as a kit for a user, e.g. an appliance manufacturer, to fit to a portion of the existing pipework of an appliance.

The valve described may be used as an ordinary on/-off valve but by virtue of the low mass of its armature and low-noise performance it is particularly suitable for use in a pressure-regulating system of a known kind in which the valve is rapidly cycled on and off, as frequently as thirty times a second, and in which the mean pressure is continuously adjustable over a range by altering the width (i.e. duration) of the energising pulses.

The modified version shown in FIG. 2, in which corresponding reference numerals have been used where appropriate, but with a suffix added where it is not identical with that shown in FIG. 1, is suitable for applications where, even though the valve may be used in its cycling mode to produce a controlled variable mean flow rate, it may be necessary to provide means whereby the minimum rate of flow is maintained at a standard level independent of the cycling action.

With this in mind the support 2' in the form of a brass bush has an axially extending groove 12 in its external cylindrical surface forming a permanently open passage by-passing the valve seating. The flow through it is determined by its cross-section and if necessary it may be set accurately, after assembly, by slightly indenting the wall of the tube 1 from outside while monitoring the flow. Also, in the version illustrated, the seating is formed at 4' integrally with the support bush and the valve head 7 carries a soft facing 7'.

Because the valve shown in the left-hand part of FIG. 2 cannot be closed off completely it may be mounted directly in series with a shut-off valve of the same construction (but without the by-pass) using the same body 1. This second valve is shown in the right-hand half of FIG. 2, and although it has a separate operating solenoid the solenoids of both valves may be enclosed in a common external casing 13. Also it will be seen that the stop for the left-hand valve forms the seating support for the right-hand valve.

It will be appreciated that in both the versions described the entire body of the valve (or valves) is formed as a plain length of commercially available drawn brass pipe, free of any machining, and at the most there might be slight deformation of it to locate the other components of the valve. For incorporating it in pipework any of the normal known pipe terminations may be used, e.g. olives, collars, bell-mouthing, or whatever is appropriate to the installation in question, in fact for installation purposes it can be treated as just another length of pipe.

I claim:

1. A solenoid-operated valve for fluids, said valve comprising a body formed as a plain length of pipe of uniform diameter, substantially free of shoulders or machined surfaces, and an armature of ferromagnetic material which is movable axially within said body, a seating within said body, a valve head on said armature movable into and out of engagement with said seating, clearance being provided in the cross-section of said armature and said seating for passage of fluid axially through said body, and an actuating solenoid coil, said coil fitting over the exterior of said body, said exterior being substantially smooth.

2. The valve set forth in claim 1 wherein said body is of non-ferromagnetic material.

3. The valve set forth in claim 2 wherein said body is formed of drawn brass pipe.

4. The valve set forth in claim 2 or claim 3 wherein the inside of said pipe is 'ballized'.

5. The valve set forth in claim 1 including a stop within said pipe, engaged by said armature to define the open position of the valve.

6. The valve set forth in claim 5 wherein said stop is of ferromagnetic material.

7. The valve set forth in claim 5 or claim 6 including a helical coil compression spring acting between said armature and said stop to urge said valve head to the closed position.

8. The valve set forth in claim 5 including an O-ring, said O-ring forming a cushion between said armature and said stop in the open position of the valve.

9. The valve set forth in claim 1 wherein there is a by-pass allowing a predetermined small flow with the valve closed, said valve being in series with a second valve of the same kind but without said by-pass, and both of said valves being mounted in a common body.

10. A method of manufacturing a solenoid-operated valve for fluids comprising the steps of taking a length of plain drawn non-ferrous pipe, locating within said pipe a valve seating, mounting within said pipe an armature which is movable within said pipe and carries a valve head thereby movable into and out of engagement with said seating, locating within said pipe a stop defining the position of said armature in the open position of the valve, mounting within said pipe also a spring acting on said armature or valve head, and locating on the outside of said pipe a solenoid for acting on said armature.

11. The valve set forth in claim 6 including a helical coil compression spring acting between said armature and said stop to urge said valve head to the closed position.

12. The valve set forth in claim 6 including an O-ring, said O-ring forming a cushion between said armature and said stop in the open position of the valve.

13. The valve set forth in claim 7 including an O-ring, said O-ring forming a cushion between said armature and said stop in the open position of the valve.

* * * * *